(12) United States Patent
Duan et al.

(10) Patent No.: US 11,270,614 B2
(45) Date of Patent: Mar. 8, 2022

(54) DATA TRANSMISSION METHOD, TIMING CONTROLLER, SOURCE DRIVER AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xin Duan, Beijing (CN); Hao Zhu, Beijing (CN); Jieqiong Wang, Beijing (CN); Ming Chen, Beijing (CN); Xibin Shao, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/619,535

(22) PCT Filed: Jun. 4, 2018

(86) PCT No.: PCT/CN2018/089764
§ 371 (c)(1),
(2) Date: Dec. 5, 2019

(87) PCT Pub. No.: WO2018/223924
PCT Pub. Date: Dec. 13, 2018

(65) Prior Publication Data
US 2020/0126465 A1  Apr. 23, 2020

(30) Foreign Application Priority Data
Jun. 9, 2017 (CN) .......................... 201710434614.4

(51) Int. Cl.
*G09G 3/20* (2006.01)
*G09G 3/36* (2006.01)
(Continued)

(52) U.S. Cl.
CPC ................. *G09G 3/20* (2013.01); *G06F 1/12* (2013.01); *G09G 3/2096* (2013.01);
(Continued)

(58) Field of Classification Search
CPC ...... G09G 3/3648; G09G 3/20; G09G 3/3611; G09G 3/2092; G09G 3/3685;
(Continued)

(56) References Cited

U.S. PATENT DOCUMENTS 7,876,130 B2 * 1/2011 Lee ........................ H04L 7/0008
326/82
9,203,606 B2 * 12/2015 Han .......................... H04L 7/04
(Continued)

FOREIGN PATENT DOCUMENTS

CN  101499244 A  8/2009
CN  101751363 A  6/2010
(Continued)

OTHER PUBLICATIONS

Search Report for International Application No. PCT/CN2018/089764 dated Aug. 29, 2018.
(Continued)

*Primary Examiner* — Dismery Mercedes
(74) *Attorney, Agent, or Firm* — Calfee, Halter & Griswold LLP

(57) ABSTRACT

A data transmission method, a timing controller, a source driver and a display device, and a data transmission technology. The method includes: a timing controller generating an idle signal, which may be a random signal with a clock edge; and the timing controller sending the idle signal to a source driver, wherein the source driver may judge whether a clock signal of the source driver is synchronous with that of the timing controller according to the idle signal.

15 Claims, 7 Drawing Sheets

(51) Int. Cl.
*G09G 5/00* (2006.01)
*H04L 7/10* (2006.01)
*H04L 9/08* (2006.01)
*H04L 25/03* (2006.01)
*G06F 1/12* (2006.01)
*G09G 5/18* (2006.01)

(52) U.S. Cl.
CPC ........... *G09G 3/3688* (2013.01); *G09G 5/006* (2013.01); *G09G 5/18* (2013.01); *H04L 7/10* (2013.01); *H04L 9/0869* (2013.01); *H04L 25/03866* (2013.01); *G09G 2310/08* (2013.01); *G09G 2330/06* (2013.01); *G09G 2370/08* (2013.01)

(58) Field of Classification Search
CPC ...... G09G 3/2096; G09G 5/006; G09G 5/005; G09G 5/008; G09G 5/18; G09G 2310/08; G09G 2310/0275; G09G 2370/08; G09G 2330/06; G09G 2330/021; G09G 3/3688; G09G 2370/10; G09G 2370/14; H04L 12/43; H04L 2209/34; H04L 25/03866; H04L 27/2613; H04L 1/0071; H04L 1/0041; H04L 1/0057; H04L 1/0045; H04L 7/10; H04L 7/0054; H04L 9/0869; H04L 9/0668; G06F 3/0412; G06F 3/0416; G06F 7/58; G06F 11/1048; G06F 11/1004; G06F 11/1012; G06F 2211/007; G06F 1/08; G06F 1/12; G06F 1/1689; G06F 3/20; G06F 3/04184; H03M 1/0673; H03M 13/09; H03M 13/05
See application file for complete search history.

(56) References Cited

U.S. PATENT DOCUMENTS

| | | | | |
|---|---|---|---|---|
| 9,299,285 B2 * | 3/2016 | Yang | .................. | G09G 3/2096 |
| 9,984,655 B2 * | 5/2018 | Han | .................... | G09G 5/008 |
| 10,269,284 B2 * | 4/2019 | Jung | ................... | G09G 3/3688 |
| 2010/0153614 A1 * | 6/2010 | Ushigome | ........... | G06F 13/4278 |
| | | | | 710/316 |
| 2011/0199369 A1 | 8/2011 | Huang et al. | | |
| 2012/0146965 A1 * | 6/2012 | Baek | ..................... | G09G 3/006 |
| | | | | 345/204 |
| 2013/0036335 A1 * | 2/2013 | Kim | ...................... | G09G 3/006 |
| | | | | 714/704 |
| 2014/0184574 A1 * | 7/2014 | Shie | ...................... | G09G 5/008 |
| | | | | 345/204 |
| 2015/0187315 A1 * | 7/2015 | Park | ...................... | G09G 3/3685 |
| | | | | 345/99 |
| 2015/0213751 A1 * | 7/2015 | Lee | ...................... | G09G 3/2085 |
| | | | | 345/212 |
| 2016/0292426 A1 * | 10/2016 | Gibart | ..................... | G06F 21/85 |
| 2017/0132966 A1 | 5/2017 | Lim et al. | | |

FOREIGN PATENT DOCUMENTS

| | | |
|---|---|---|
| CN | 104052567 | 9/2014 |
| CN | 104052567 A | 9/2014 |
| CN | 104751811 | 7/2015 |
| CN | 104751811 A | 7/2015 |
| CN | 105096892 | 11/2015 |
| EP | 2360667 | 8/2011 |
| KR | 20170053370 A | 5/2017 |

OTHER PUBLICATIONS

Office action from Chinese Application No. 201710434614.4 dated Jan. 6, 2021.
Search Report from European Application No. 18812853.2 dated Feb. 1, 2021.

* cited by examiner

DATA TRANSMISSION METHOD, TIMING CONTROLLER, SOURCE DRIVER AND DISPLAY DEVICE

CROSS REFERENCE TO RELATED APPLICATIONS

The present application is a 35 U.S.C. 371 national stage application of PCT International Application No. PCT/CN2018/089764, filed on Jun. 4, 2018, which claims the benefit of Chinese Patent Application No. 201710434614.4, filed on Jun. 9, 2017, the entire disclosures of which are incorporated herein by reference.

TECHNICAL FIELD

The disclosure relates to the field of data transmissions, and in particular, to a data transmission method, a timing controller, a source driver and a display device.

BACKGROUND

A display device generally includes a display panel and a panel driving circuit for driving the display panel, the panel driving circuit includes a timing controller (which may be referred to as "Tcon" for short), a gate driving circuit and a source driving circuit, wherein the gate driving circuit includes a plurality of gate drivers, and the source driving circuit includes a plurality of source drivers.

The panel driving circuit usually adopts a point-to-point interface transmission mode to transmit a data signal. In the point-to-point interface transmission mode, the timing controller is coupled to the plurality of source drivers via a plurality of data transmission lines, each of the source drivers corresponds to a data transmission line, the timing controller may transmit a data signal to a corresponding source driver via the data transmission line, the data signal usually includes a display signal, a clock signal and an idle signal, the clock signal is usually embedded in the display signal, the idle signal is usually a clock signal with a fixed frequency, and after receiving the data signal, the source driver may recover the clock signal according to features of the data signal, sample the display signal according to the recovered clock signal and display an image based on a sampling result, and the source driver may further judge whether the recovered clock signal is synchronized with a clock signal inside the source driver according to the idle signal, wherein the display signal is used for carrying display data, which is used for displaying an image.

SUMMARY

This disclosure provides a data transmission method, a timing controller, a source driver and a display device.

According to an exemplary embodiment, there is provided a data transmission method for a timing controller, the timing controller being coupled to at least one source driver, the method including: generating an idle signal, which is a random signal with a clock edge; and sending the idle signal to a source driver, which source driver is any of the at least one source driver.

In an exemplary embodiment, the idle signal carries at least two idle data successively arranged in a chronological order, there is a clock edge between any two adjacent idle data in the at least two idle data, and each of the idle data is random data.

In an exemplary embodiment, the step of generating an idle signal may further include generating the at least two idle data respectively, and generating any of the at least two idle data comprises: acquiring original idle data, which is pre-agreed by the timing controller and the source driver; performing pseudo-random processing on the original idle data to obtain random idle data; encoding the random idle data to obtain first idle data, which is any of the at least two idle data.

In an exemplary embodiment, the step of performing pseudo-random processing on the original idle data may further include: generating a pseudo-random sequence; and scrambling the original idle data employing the pseudo-random sequence.

In an exemplary embodiment, the number of bit digits of the pseudo-random sequence is equal to that of the original idle data, and the step of scrambling the original idle data employing the pseudo-random sequence may further include: performing XOR processing on the pseudo-random sequence and the original idle data.

In an exemplary embodiment, the random idle data has a first length, and the first idle data has a second length that is at least 2 greater than the first length.

In an exemplary embodiment, the random idle data is 8-bit data, the first idle data is 10-bit data, and the random idle data may be encoded employing an 8b/10b encoding approach to obtain the first idle data.

In an exemplary embodiment, the step of encoding the random idle data to obtain first idle data may further include: encoding the random idle data according to a preset encoding mapping relationship to obtain encoded random idle data, of which the length is between the first length and the second length; and performing clock flip digit processing on the encoded random idle data and adding a bit indicating whether clock flip digit processing has been performed to obtain the first idle data.

In an exemplary embodiment, it may be possible to encode the random idle data according to a preset 8b/9b encoding mapping relationship to obtain encoded random idle data, which is 9-bit data.

According to another exemplary embodiment, there is provided a data transmission method for a source driver, which source driver is any of at least one source driver coupled to a timing controller, the method including: receiving an idle signal sent by the timing controller, which idle signal is a random signal with a clock edge; judging whether a clock signal of the source driver is synchronous with that of the timing controller according to the idle signal.

In an exemplary embodiment, the step of judging whether a clock signal of the source driver is synchronous with that of the timing controller according to the idle signal may further include:
acquiring the clock edge of the idle signal; and judging whether the clock signal of the source driver is synchronous with that of the timing controller according to the clock edge of the idle signal.

In an exemplary embodiment, the idle signal carries at least two idle data successively arranged in a chronological order, there is a clock edge between any two adjacent idle data in the at least two idle data, and each of the idle data is random data.

In an exemplary embodiment, the idle data is obtained by the timing controller scrambling original idle data to obtain random idle data and then encoding the random idle data, and the method may further include: decoding the idle data to obtain decoded idle data; descrambling the decoded idle data to obtain descrambled idle data; and judging whether there is an error in the signal transmission procedure according to the descrambled idle data.

In an exemplary embodiment, the original idle data is pre-agreed by the timing controller and the source driver, and the step of judging whether there is an error in the signal transmission procedure according to the descrambled idle data may further include: judging whether the descrambled idle data is the same as the original idle data; determining that there is no error in the signal transmission procedure if the descrambled idle data is the same as the original idle data; and determining that there is an error in the signal transmission procedure if the descrambled idle data is different from the original idle data.

According to a further exemplary embodiment, there is provided a timing controller, which is coupled to at least one source driver and which may include: a generator, which may be configured for generating an idle signal, which is a random signal with a clock edge; and a sender, which may be configured for sending the idle signal to a source driver, which source driver is any of the at least one source driver.

In an exemplary embodiment, the idle signal carries at least two idle data successively arranged in a chronological order, there is a clock edge between any two adjacent idle data in the at least two idle data, and each of the idle data is random data.

In an exemplary embodiment, the generator may further include: an acquisition unit, which may be configured for acquiring original idle data, which is pre-agreed by the timing controller and the source driver; a processing unit, which may be configured for performing pseudo-random processing on the original idle data to obtain random idle data; an encoding unit, which may be configured for encoding the random idle data to obtain first idle data, which is any of the at least two idle data.

In an exemplary embodiment, the processing unit may be configured for scrambling the original idle data employing a pseudo-random sequence.

In an exemplary embodiment, the number of bit digits of the pseudo-random sequence is equal to that of the original idle data, and the processing unit may be configured for performing XOR processing on the pseudo-random sequence and the original idle data.

In an exemplary embodiment, the random idle data has a first length, and the first idle data has a second length that is at least 2 greater than the first length.

In an exemplary embodiment, the random idle data is 8-bit data, the first idle data is 10-bit data, and the encoding unit may be configured for encoding the random idle data employing an 8b/10b encoding approach to obtain the first idle data.

In an exemplary embodiment, the encoding unit may be configured for encoding the random idle data according to a preset encoding mapping relationship to obtain encoded random idle data, of which the length is between the first length and the second length; and performing clock flip digit processing on the encoded random idle data and adding a bit indicating whether clock flip digit processing has been performed to obtain the first idle data.

In an exemplary embodiment, the encoding unit may be configured for encoding the random idle data according to a preset 8b/9b encoding mapping relationship to obtain encoded random idle data, which is 9-bit data.

According to a further exemplary embodiment, there is provided a source driver, which is any of at least one source driver coupled to a timing controller and which includes: a receiver, which may be configured for receiving an idle signal sent by the timing controller, which idle signal is a random signal with a clock edge; and a synchronization judger, which may be configured for judging whether a clock signal of the source driver is synchronous with that of the timing controller according to the idle signal.

In an exemplary embodiment, the synchronization judger may further be configured for: acquiring the clock edge of the idle signal; and judging whether the clock signal of the source driver is synchronous with that of the timing controller according to the clock edge of the idle signal.

In an exemplary embodiment, the idle signal carries at least two idle data successively arranged in a chronological order, there is a clock edge between any two adjacent idle data in the at least two idle data, and each of the idle data is random data.

In an exemplary embodiment, the idle data is obtained by the timing controller scrambling original idle data to obtain random idle data and then encoding the random idle data, and the source driver may further include: a decoder, which may be configured for decoding the idle data to obtain decoded idle data; a descrambler, which may be configured for descrambling the decoded idle data to obtain descrambled idle data; and a transmission judger, which may be configured for judging whether there is an error in the signal transmission procedure according to the descrambled idle data.

According to a further exemplary embodiment, there is provided a display device including any of the timing controllers as described above and a plurality of source drivers of the kind of any of the source drivers as described above.

This Summary introduces some exemplary embodiments in a simplified form that are further described below in the Detailed Description. This Summary is not intended to give necessary features or essential features of the claimed subject matter, nor is it intended to limit the scope of the claimed subject matter. In addition, as described herein, various other features and advantages may also be incorporated into the techniques as needed.

BRIEF DESCRIPTION OF THE DRAWINGS

In order to more clearly illustrate the technical solutions of some embodiments of the disclosure, the disclosure provides the following appended drawings to be used in the description of exemplary embodiments. It should be appreciated that, the drawings in the following description only relate to some embodiments, and for the person having ordinary skills in the art, other drawings may also be obtained according to these drawings under the premise of not paying out undue experimentation, which other drawings also fall within the scope of the invention.

The drawings herein are incorporated into the specification and constitute a part of the specification, show exemplary embodiments in accordance with the disclosure, and are used for explaining the principle of the invention along with the specification.

DETAILED DESCRIPTION

To be able to more clearly understand the objects, technical solutions and advantages of some embodiments, in the following, exemplary embodiments will be further described in detail in conjunction with the drawings. It can be appreciated by the person having ordinary skills in the art that, the described embodiments are just a part of embodiments of the disclosure, and not all the embodiments. Based on the embodiments in the disclosure, all the other embodiments obtained by the person having ordinary skills in the art under the premise of not paying out undue experimentation pertain to the scope protected by the invention.

Figure 1:
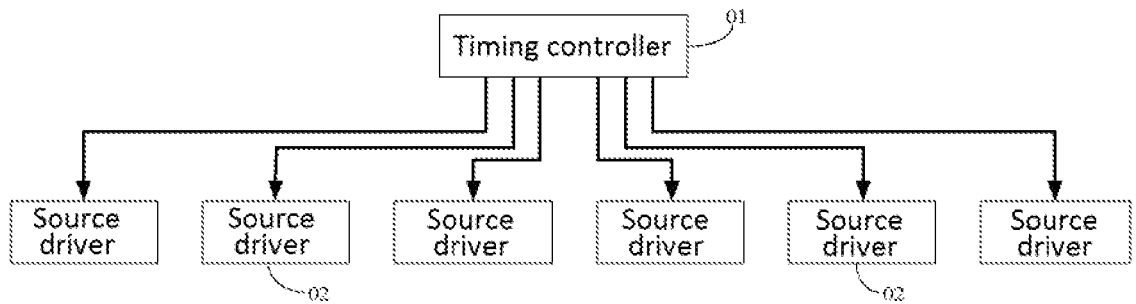
FIG. 1 is a schematic diagram of an application environment of a data transmission method provided according to an exemplary embodiment.

FIG. 1 shows a schematic diagram of an application environment of a data transmission method provided according to an exemplary embodiment. With reference to FIG. 1, the data transmission method may be applied in a display device (not shown in FIG. 1), the display device may include a display panel (not shown in FIG. 1) and a panel driving circuit (not shown in FIG. 1) for driving the display panel, the panel driving circuit (not shown in FIG. 1) may include a timing controller 01, a gate driving circuit (not shown in FIG. 1) and a source driving circuit, wherein the gate driving circuit may include a plurality of gate drivers (not shown in FIG. 1), and the source driving circuit may include a plurality of source drivers 02. The timing controller 01 is coupled to the plurality of source drivers 02 via a plurality of data transmission lines (not shown in FIG. 1), each of the source drivers 02 corresponds to a data transmission line, the timing controller 01 may transmit a data signal to a corresponding source driver 02 via a data transmission line, and the data signal usually may include a display signal, a clock signal and an idle signal.

Figure 2:
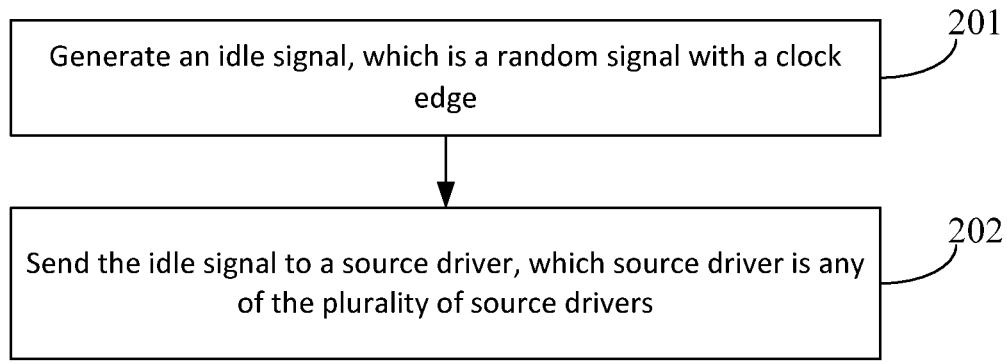
FIG. 2 is a method flow chart of a data transmission method provided according to an embodiment.

FIG. 2 shows a method flow chart of a data transmission method provided according to an exemplary embodiment. The data transmission method may be used in the timing controller 01 in the implementation environment as shown in FIG. 1, in which the timing controller 01 is coupled to the plurality of source drivers 02, respectively. As shown in FIG. 2, the data transmission method may include:

step 201, generating an idle signal, which is a random signal with a clock edge; and step 202, sending the idle signal to a source driver, which source driver is any of the plurality of source drivers. It is noted that, although the plurality of source drivers 02 are shown in FIG. 1, the data transmission method is equally adapted for communicating a data signal only to one source driver 02.

From the above, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

In an exemplary embodiment, the idle signal carries at least two idle data successively arranged in a chronological order, there is a clock edge between any two adjacent idle data in the at least two idle data, and each of the idle data is random data.

In an exemplary embodiment, the step of generating an idle signal may include generating the at least two idle data respectively, and generating any of the at least two idle data includes:

acquiring original idle data, which is pre-agreed by the timing controller and the source driver;

performing pseudo-random processing on the original idle data to obtain random idle data;

encoding the random idle data to obtain first idle data, which is any of the at least two idle data.

In an exemplary embodiment, the step of performing pseudo-random processing on the original idle data may include:

generating a pseudo-random sequence; and scrambling the original idle data employing the pseudo-random sequence.

In an exemplary embodiment, the step of generating a pseudo-random sequence may include: generating a pseudo-random sequence through a linear shift register.

In an exemplary embodiment, the number of bit digits of the pseudo-random sequence is equal to that of the original idle data, and the step of scrambling the original idle data employing the pseudo-random sequence may include: performing XOR processing on the pseudo-random sequence and the original idle data.

In an exemplary embodiment, the random idle data is 8-bit data, the first idle data is 10-bit data, and the step of encoding the random idle data to obtain first idle data may include: encoding the random idle data employing an 8b/10b encoding approach to obtain the first idle data. It is noted that, although the 8b/10b encoding approach is employed in this example, in other embodiments, it may even be possible to employ random idle data of a different length and first idle data of a different length. Accordingly, it may also be possible to employ other different encoding approaches, and the disclosure is not limited to the 8b/10b encoding approach.

In an exemplary embodiment, the step of encoding the random idle data employing an 8b/10b encoding approach to obtain the first idle data may include:

encoding the random idle data according to a preset encoding mapping relationship to obtain encoded random idle data, of which the length is between the first length of the random idle data and the second length of the first idle data, wherein for example, a preset 8b/9b encoding mapping relationship may be employed, and the thus obtained encoded random idle data is 9-bit data; and performing clock flip digit processing on the encoded random idle data and adding a bit indicating whether clock flip digit processing has been performed to obtain the first idle data.

In a specific implementation, the original idle data is binary data 00000000.

In an exemplary embodiment, the step of sending the idle signal to a source driver may include: sending a data signal to the source driver, which data signal includes a display signal, a clock signal and an idle signal, which clock signal is embedded into the display signal.

All the above exemplary embodiments may be combined in any form to form further embodiments of the disclosure, which will not be repeated here one by one any longer.

From the above, in the data transmission method provided according to some exemplary embodiments of the disclosure, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

Figure 3:
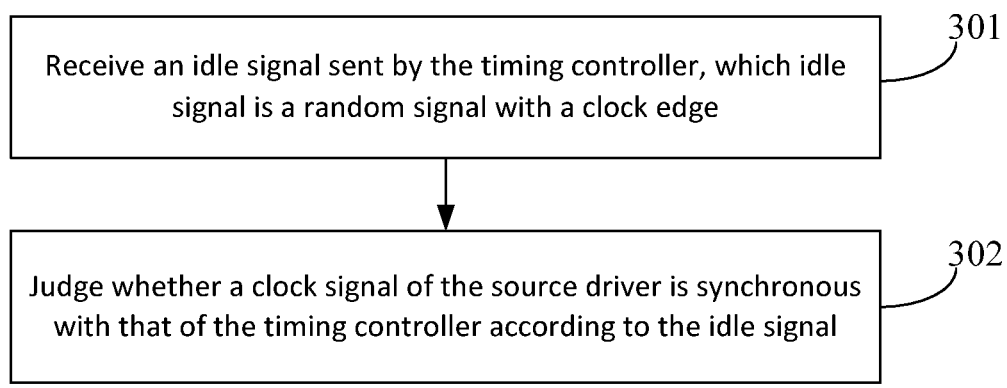
FIG. 3 is a method flow chart of another data transmission method provided according to an exemplary embodiment.

FIG. 3 shows a method flow chart of another data transmission method provided according to an exemplary embodiment. The data transmission method may be used in a source driver, the source driver may be any of the source drivers 02 in the implementation environment as shown in FIG. 1, and the source driver is coupled to the timing controller 01. As shown in FIG. 3, the data transmission method may include: step 301, receiving an idle signal sent by the timing controller, which idle signal is a random signal with a clock edge; and step 302, judging whether a clock signal of the source driver is synchronous with that of the timing controller according to the idle signal.

In the above data transmission method, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

In an exemplary embodiment, the step of judging whether a clock signal of the source driver is synchronous with that of the timing controller according to the idle signal may include:

acquiring the clock edge of the idle signal; and judging whether the clock signal of the source driver is synchronous with that of the timing controller according to the clock edge of the idle signal.

In an exemplary embodiment, the idle signal carries at least two idle data successively arranged in a chronological order, there is a clock edge between any two adjacent idle data in the at least two idle data, and each of the idle data is random data.

In an exemplary embodiment, the idle data is obtained by the timing controller scrambling original idle data to obtain random idle data and then encoding the random idle data, the idle data is just any of the at least two idle data, and after the receiving an idle signal sent by the timing controller, the data transmission method may further include:

decoding the idle data to obtain decoded idle data;

descrambling the decoded idle data to obtain descrambled idle data; and judging whether there is an error in the signal transmission procedure according to the descrambled idle data.

In an exemplary embodiment, the original idle data is pre-agreed by the timing controller and the source driver, and the step of judging whether there is an error in the signal transmission procedure according to the descrambled idle data may include:

judging whether the descrambled idle data is the same as the original idle data;

determining that there is no error in the signal transmission procedure if the descrambled idle data is the same as the original idle data; and determining that there is an error in the signal transmission procedure if the descrambled idle data is different from the original idle data.

In an exemplary embodiment, the original idle data is binary data 00000000.

In an exemplary embodiment, the step of receiving an idle signal sent by the timing controller may include: receiving a data signal sent by the timing controller, which data signal includes a display signal, a clock signal and an idle signal, which clock signal is embedded into the display signal.

All the above exemplary embodiments may be combined in any manner to form further embodiments of the disclosure, which will not be repeated here one by one any longer.

In the above data transmission method, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

Figure 4A:
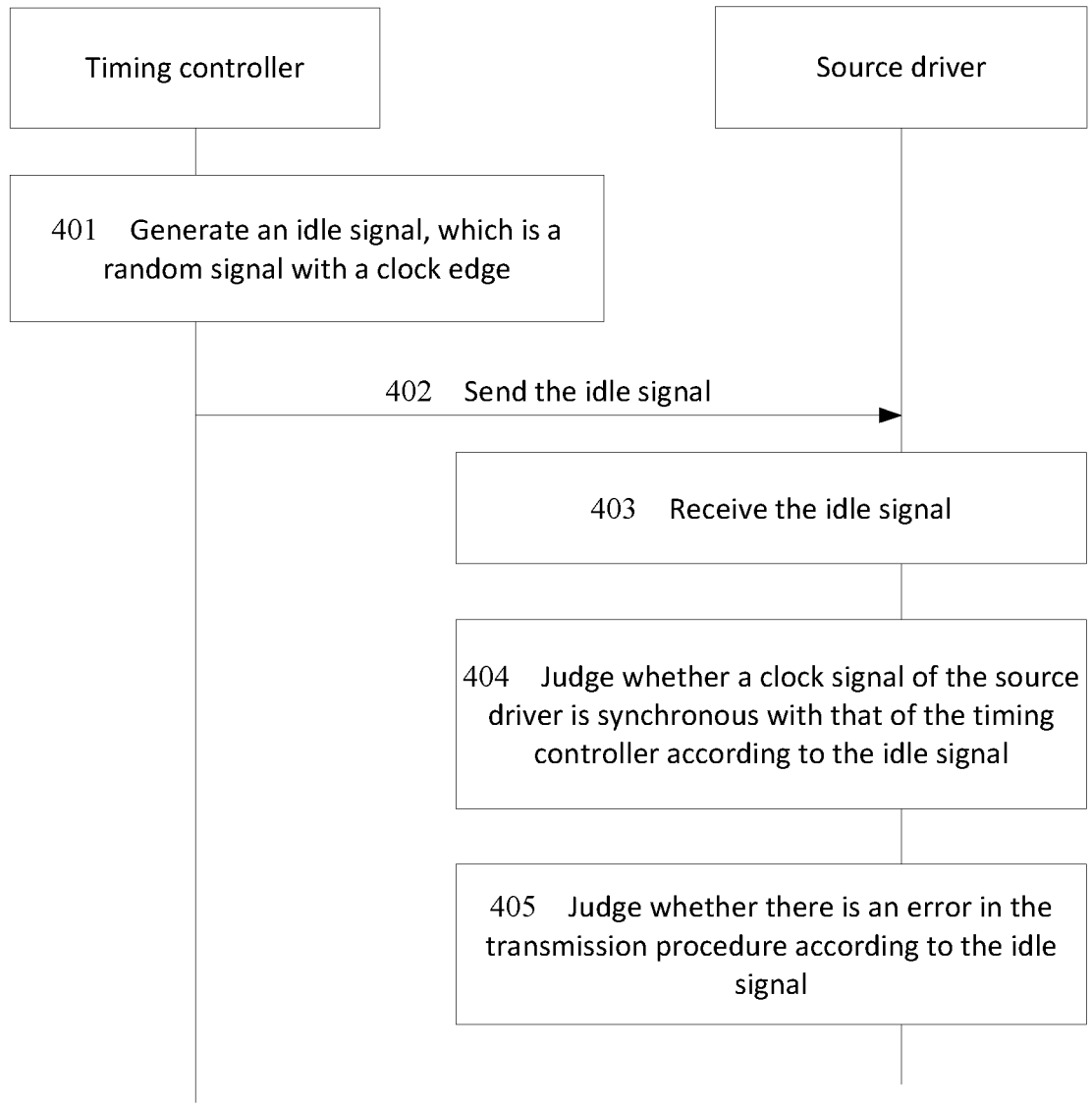
FIG. 4A is a method flow chart of still another data transmission method provided according to an exemplary embodiment.

FIG. 4A shows a method flow chart of still another data transmission method provided according to an exemplary embodiment, which data transmission method may be used in the implementation environment as shown in FIG. 1. As shown in FIG. 4A, the data transmission method may include the following steps.

At step 401, the timing controller generates an idle signal, which is a random signal with a clock edge.

Figure 4B:
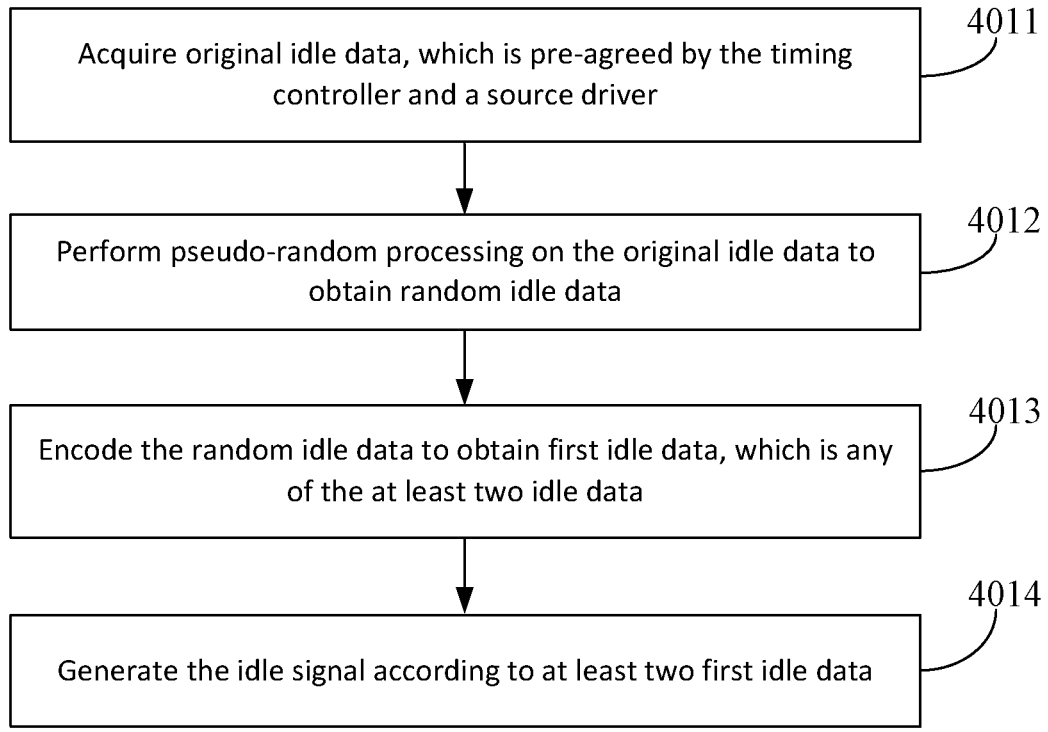
FIG. 4B is a flow chart of a method for generating an idle signal provided according to an exemplary embodiment.

Therein, the idle signal may carry at least two idle data successively arranged in a chronological order, there may be a clock edge between any two adjacent idle data in the at least two idle data, and each of the idle data is random data. FIG. 4B shows a flow chart of a method for generating an idle signal provided according to an embodiment. As shown in FIG. 4B, the method for generating an idle signal may include the following sub-steps.

At sub-step 4011, the timing controller acquires original idle data, which is pre-agreed by the timing controller and a source driver.

Therein, the original idle data may be 8-bit data, in particular, may be binary data 00000000, the timing controller may pre-agree on the original idle data with the source driver and store the original idle data, and when it is needed to generate an idle signal, the timing controller may read the original idle data stored by itself to realize acquisition of the original idle data. It is noted that, in this example, the bit digits of data are arranged in an order from low digit to high digit. For example, the arrangement order of data 10000010 is from right to left, that is, its first digit of data is 0, its last digit of data is 1, "1000" is its 4 low order digits, and "0010" is its 4 high order digits.

In an exemplary embodiment, before the timing controller acquires original idle data, the timing controller may interact with the source driver to agree on the original idle data, and an agreement procedure is, for example, but not limited to, that the timing controller sends an agreement instruction carrying the original idle data to the source driver, and after the source driver receives the agreement instruction, if the source driver agrees that the original idle data carried by the agreement instruction is employed to generate an idle signal, the source driver sends a response instruction carrying first indication information to the timing controller, which first indication information is used for indicating that the source driver agrees that the original idle data carried by the agreement instruction is employed to generate an idle signal, and thereby the agreement is successful; and if the source driver does not agree that the original idle data carried by the agreement instruction is employed to generate an idle signal, the source driver sends a response instruction carrying second indication information to the timing controller, which second indication information is used for indicating that the source driver does not agree that the original idle data carried by the agreement instruction is employed to generate an idle signal, and thereby the agreement fails; or, if the source driver does not agree that the original idle data carried by the agreement instruction is employed to generate an idle signal, the source driver may also not send a response instruction to the timing controller, and at this point, the timing controller and the source driver may agree on a preset duration of receiving a response instruction in advance, and if the timing controller does not receive a response instruction sent by the source driver within the preset duration after the agreement instruction was issued, the timing controller may determine that the source driver does not agree that the original idle data carried by the agreement instruction is employed to generate an idle signal, and determine that the agreement fails.

It is noted that, that the original idle data is binary data 00000000 is just exemplary, in a practical application, the original idle data may further be binary data 11111111, or the original idle data may further be any binary data consisting of 0 and 1, which will not be limited by the disclosure. In this example, the original idle data is set to binary data 00000000, and since the binary data 00000000 has not a flip edge, this may facilitate the timing controller and the source driver to process the original idle data. The source driver may be any of the source drivers 02, and the original idle data agreed on by the timing controller with a different source driver may be identical or different, which will not be limited by the disclosure.

At sub-step 4012, the timing controller performs pseudo-random processing on the original idle data to obtain random idle data.

In particular, the timing controller may first generate a pseudo-random sequence and then scramble the original idle data employing the pseudo-random sequence, to implement pseudo-random processing of the original idle data. In an embodiment, the timing controller may generate a pseudo-random sequence through a linear shift register, and the number of bit digits of the pseudo-random sequence may be equal to that of the original idle data. In this example, since the number of bit digits of the original idle data is 8, the number of bit digits of the pseudo-random sequence is also 8, that is, the pseudo-random sequence is 8-bit data, and the timing controller may perform XOR processing on the pseudo-random sequence and the original idle data, to implement scrambling of the original idle data.

In a specific implementation, the linear shift register has an initial data, and after the initial data is inputted to the linear shift register, the linear shift register may output a pseudo-random sequence by internal operations, wherein after the linear shift register is reset, it may generate a pseudo-random sequence based on the initial data, afterwards, the linear shift register may generate a new pseudo-random sequence taking the pseudo-random sequence outputted last time as an input, and so on. In a practical application, each time a clock passes, the linear shift register may output a new pseudo-random sequence based on the pseudo-random sequence outputted at the previous clock, wherein a specific implementation procedure in which the linear shift register generates a new pseudo-random sequence based on the inputted pseudo-random sequence may be referred to the related art, which will not be limited by the disclosure. Assume that the pseudo-random sequence generated by the linear shift register is 10001101, random idle data 10001101 may be obtained by the timing controller performing XOR processing on the original idle data 00000000 and the pseudo-random sequence 10001101, and the random idle data is also 8-bit data.

By generating a pseudo-random sequence by the linear shift register and scrambling the original idle data according to the pseudo-random sequence, exactly the same original idle data may be scattered, such that it has certain randomness, and as such, in a subsequent procedure of signal transmission, signal energy may be dispersed randomly to all the frequency points, thereby avoiding the formation of an energy spike.

At sub-step 4013, the timing controller encodes the random idle data to obtain first idle data, which is any of the at least two idle data in the idle signal.

Figure 4C:
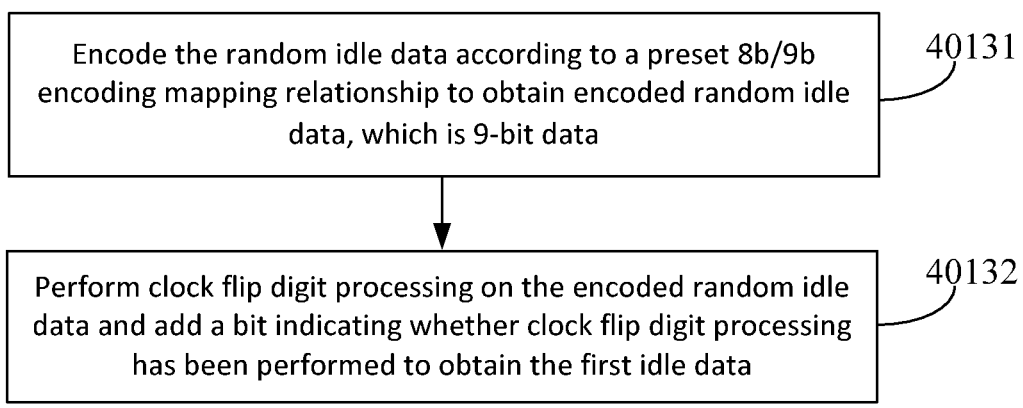
FIG. 4C is a flow chart of a method for encoding random idle data provided according to an exemplary embodiment.

In this exemplary embodiment, the random idle data is 8-bit data, the first idle data may be 10-bit data, and the timing controller may encode the random idle data employing an 8b/10b encoding (i.e., encoding 8-bit data into 10-bit data) approach to obtain the first idle data. Exemplarily, reference is made to FIG. 4C, which shows a flow chart of a method for encoding random idle data provided according to an embodiment. As shown in FIG. 4C, the encoding method may include the following sub-steps.

At sub-step 40131, the random idle data is encoded according to a preset 8b/9b encoding mapping relationship to obtain encoded random idle data, which is 9-bit data.

The timing controller may store a preset 8b/9b encoding (i.e., encoding 8-bit data into 9-bit data) mapping relationship, and the timing controller may encode the random idle data (8-bit data) according to the 8b/9b encoding mapping relationship to obtain encoded random idle data, which is 9-bit data. Therein, the 8b/9b encoding mapping relationship stored by the timing controller may be as follows:

enc[0]=d[3];
enc[1]=(~d[2]&d[1])|(d[2]&d[1]&~d[3])|(~d[2]&~d[0]);
enc[2]=(d[2]&~d[1])|(d[2]&d[1]&~d[3])|(~d[1]&d[0]);
enc[3]=d[5];
enc[4]=d[6];
enc[5]=(~d[2]&~d[1]&~d[4])|(d[2]&~d[0])|(d[1]&~d[0]);
enc[6]=(~d[2]&~d[1]&~d[4])|(d[2]&d[0])|(d[1]&d[0]);
enc[7]=d[4];
enc[8]=d[7];

wherein enc[i] is the (i+1)-th digit of data in the 9-bit data, 8≥i≥0, and i is an integer; d[j] is the (j+1)-th digit of data in the 8-bit data, 7≥j≥0, and j is an integer; and ~ represents performing an inversion operation, & represents performing an AND operation, and | represents performing an OR operation. Therein, the inversion operation represents performing an inversion operation on a binary number, for example, the result of performing an inversion operation on the binary number 1 is 0, and the result of performing an inversion operation on the binary number 0 is 1; performing an AND operation represents performing an AND operation on two binary numbers, and its rule is that the result of performing an AND operation is true if both the binary numbers are 1, and otherwise, the result of performing an AND operation is false, wherein true is 1, false is 0, and then 1&1=1, 1&0=0, 0&1=0, 0&0=0; performing an OR operation represents performing an OR operation on two binary numbers, and its rule is that the result of performing an OR operation is true if at least one of the two binary numbers is 1, wherein true is 1, false is 0, and then 1|1=1, 1|0=1, 0|1=1, 0|0=0.

Exemplarily, taking that the random idle data 10001101 is encoded according to the above 8b/9b encoding mapping relationship as an example, wherein the first digit of data to the eighth digit of data of the random idle data 10001101 are successively 1, 0, 1, 1, 0, 0, 0, 1, encoded random idle data may be obtained by encoding the random idle data 10001101 according to the above 8b/9b encoding mapping relationship, which encoded random idle data is 9-bit data 101000100, wherein in the encoded random idle data, the first digit of data enc[0]=d[3]=1;
the second digit of data enc[1]=(~d[2]&d[1])|(d[2]&d[1]&~d[3])|(~d[2]&~d[0])=(~1&0)|(1&0&~1)|(~1&~1)=(0&0)|(1&0&0)|(0&0)=0|0|0=0;
the third digit of data enc[2]=(d[2]&~d[1])|(d[2]&d[1]&~d[3])"(~d[1]&d[0])=(1&~0)|(1&0&~1)|(~0&1)=(1&1)|(1&0&0)|(1&1)=1|0|1=1;
the fourth digit of data enc[3]=d[5]=0;
the fifth digit of data enc[4]=d[6]=0;
the sixth digit of data enc[5]=(~d[2]&~d[1]&~d[4])|(d[2]&~d[0])|(d[1]&~d[0])=(~1&~0&~0)|(1&~1)|(0&~1)=(0&1&1)|(1&0)|(0&0)=0|0|0=0;
the seventh digit of data enc[6]=(~d[2]&~d[1]&~d[4])|(d[2]&d[0])|(d[1]&d[0])=(~1&~0&~0)|(1&1)|(0&1)=(0&1&1)|(1&1)|(0&1)=0|1|0=1;
the eighth digit of data enc[7]=d[4]=0;
the ninth digit of data enc[8]=d[7]=1.

At sub-step 40132, clock flip digit processing is performed on the encoded random idle data and a bit indicating whether clock flip digit processing has been performed is added to obtain the first idle data.

The timing controller may perform clock flip digit processing on the encoded random idle data and add an indication bit to obtain the first idle data, which is 10-bit data. For example, the timing controller may add a tenth digit of data behind the encoded random idle data, and cause the first idle data to have a clock flip digit, and the tenth digit of data may be used for indicating whether the first 9 digits of data of the first idle data have undergone the encoding of bit-by-bit reversion, in order that the first idle data can be correctly decoded subsequently. Therein, the tenth digit of data may be 0 or 1, and when the tenth digit of data of the first idle data is 1, the tenth digit of data indicates that the first 9 digits of data of the first idle data have undergone the encoding of bit-by-bit reversion, and when the tenth digit of data of the first idle data is 0, the tenth digit of data indicates that the first 9 digits of data of the first idle data have not undergone the encoding of bit-by-bit reversion.

In the above exemplary embodiments, in terms of transmission time, the idle data is usually located behind the display data. Therefore, when performing clock flip digit processing on the encoded random idle data, the timing controller has already encoded the display data located in front of the encoded random idle data, that is, there is at least one data (display data or idle data) that has been encoded in front of the encoded random idle data. Since the data transmission procedure is encoded employing the 8b/10b encoding approach, the encoded data is usually 10-bit data. According to whether the first digit of data of the encoded random idle data is identical to the tenth digit of data of target data, the timing controller may determine whether it is necessary to perform the encoding of bit-by-bit reversion on the encoded random idle data, and in turn determine a specific value of the tenth digit of data to be added, wherein the target data is data located in front of and adjacent to the encoded random idle data, and the target data may be display data, or may also be idle data.

In particular, the timing controller may detect whether the first digit of data of the encoded random idle data is identical to the tenth digit of data of the target data, and when the first digit of data of the encoded random idle data is identical to the tenth digit of data of the target data, in order to have a clock edge between the first idle data and the target data, the timing controller may perform the encoding of bit-by-bit reversion on the encoded random idle data, and add a tenth digit of data behind the encoded random idle data to obtain the first idle data, and at this point, the value of the tenth digit of data is 1 and it is used for indicating that the first 9 digits of data of the first idle data have undergone the encoding of bit-by-bit reversion; and when the first digit of data of the encoded random idle data is different from the tenth digit of data of the target data, there is a clock edge between the first idle data and the target data, the timing controller does not need to perform the encoding of bit-by-bit reversion on the encoded random idle data, and therefore, the timing controller directly adds a tenth digit of data behind the encoded random idle data to obtain the first idle data, and at this point, the value of the tenth digit of data is 0 and it is used for indicating that the first 9 digits of data of the first idle data have not undergone the encoding of bit-by-bit reversion.

Exemplarily, the encoded random idle data is 101000101, and assume that the target data is 0101000100. Since the first digit of data of the encoded random idle data is 1, and the tenth digit of data of the target data is 0, the first digit of data of the encoded random idle data is different from the tenth digit of data of the target data, and the timing controller directly adds a tenth digit of data 0 behind the encoded random idle data 101000101 to obtain the first idle data 0101000101. Again exemplarily, the encoded random idle data is 101000101, and assume that the target data is 1100100100. Since the first digit of data of the encoded random idle data is 1, and the tenth digit of data of the target data is 1, the first digit of data of the encoded random idle data is identical to the tenth digit of data of the target data, and the timing controller performs the encoding of bit-by-bit reversion on the encoded random idle data 101000101 to obtain 010111010, and then adds a tenth digit of data 1 behind 010111010 to obtain the first idle data 1010111010.

It is noted that, by performing clock flip digit processing on the encoded random idle data, it may be ensured that there is a clock edge between any two adjacent idle data, which thus facilitates the source driver to judge clock synchronization and can guarantee the accuracy of decoding.

At sub-step 4014, the timing controller generates the idle signal according to at least two first idle data.

After generating idle data, the timing controller may generate the idle signal according to at least two said idle data. In an exemplary embodiment, the timing controller causes at least two idle data to be carried on the idle signal according to an order of transmission time of the at least two idle data.

Figure 4D:
FIG. 4D is a schematic diagram of a format of an idle signal provided according to an exemplary embodiment.
Figure 4E:
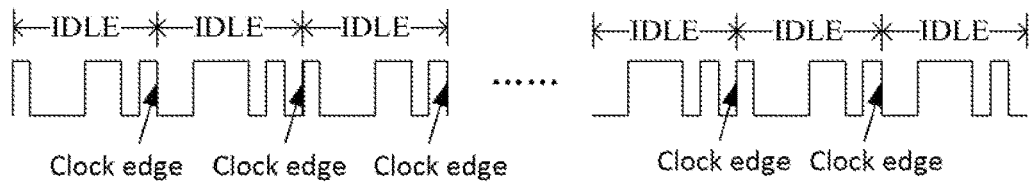
FIG. 4E is a waveform diagram of an idle signal provided according to an exemplary embodiment.
Figure 4F:
FIG. 4F is a waveform diagram of an idle signal provided by the related art.

FIG. 4D shows a schematic diagram of a format of an idle signal provided according to an exemplary embodiment. As shown in FIG. 4D, multiple idle data IDLEs are carried on the idle signal, and each of the idle data IDLEs may be generated employing the sub-step 4011 to the sub-step 4013. Further, FIG. 4E shows a waveform diagram of an idle signal provided according to an embodiment. As shown in FIG. 4E, each idle data IDLE carried by the idle signal is random data, and there is a clock edge between any two adjacent idle data IDLEs. Exemplarily, FIG. 4F shows a waveform diagram of an idle signal provided by the related art. With reference to FIG. 4F, the idle signal may be a clock signal with a fixed frequency. The energy of a clock signal with a fixed frequency will be concentrated at a certain frequency point and easily form an energy spike, and the energy spike will form large electromagnetic radiation, so the transmission procedure of the idle signal will easily affect the electromagnetic interference (EMI for short) characteristic of a display device, such that the anti-EMI capability of the display device is poor. However, the idle signal as shown in FIG. 4E is a random signal and does not easily form an energy spike, its electromagnetic radiation is small, and its transmission procedure does not easily affect the EMI characteristic of the display device. Here, it is noted that, the idle data IDLEs as shown in FIG. 4E are just exemplary, each of the idle data IDLEs actually includes 10-bit digits according to the above description, and each of the idle data IDLEs may further be other random data, which will not be limited by the disclosure.

At step 402, the timing controller sends the idle signal to the source driver.

After generating the idle signal, the timing controller may send the idle signal to the source driver. For example, the timing controller may send the idle signal as shown in FIG. 4E to the source driver. In an embodiment, the data of each frame of image may include display data, clock data and idle data, the display data is carried on a display signal, the clock data is carried on a clock signal, and the idle data is carried on an idle signal, and the display data is used for image display, the clock data is used for clock recovery, and the idle data may be used for judging whether clocks are synchronous. From this, it can be seen that for each frame of image to be displayed, the timing controller needs to send a display signal, a clock signal and an idle signal to the source driver. Therefore, at this step 402, the timing controller may send a data signal to the source driver, which data signal include a display signal, a clock signal and an idle signal, which clock signal is embedded in the display signal. In an embodiment, the timing controller is coupled to the source driver via a data transmission line, and the timing controller may send the data signal to the source driver via the data transmission line.

Figure 4G:
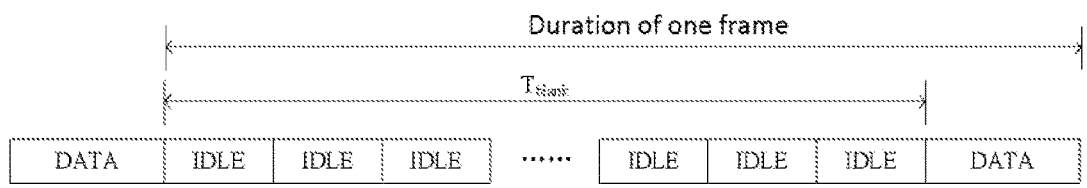
FIG. 4G is a schematic diagram of a data signal provided according to an exemplary embodiment.
Figure 4H:
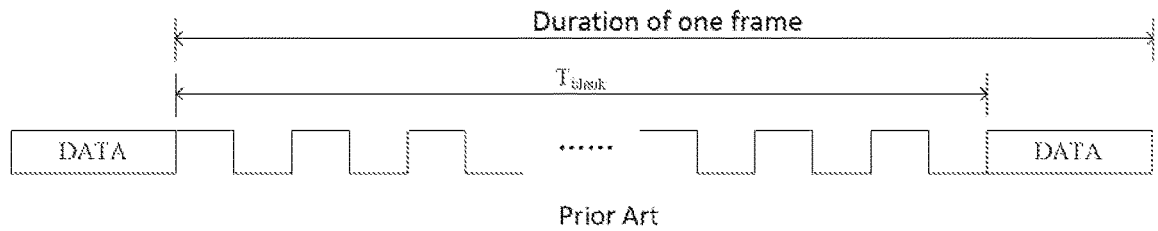
FIG. 4H is a schematic diagram of a data signal provided by the related art.

Exemplarily, FIG. 4G shows a schematic diagram of a format of a data signal provided according to an exemplary embodiment. With reference to FIG. 4G, the data signal may include a display signal, a clock signal and an idle signal, the display signal carries display data DATA, the clock signal is embedded into the display signal (that is, clock data is embedded into the display data DATA), the idle signal carries idle data IDLE, the time corresponding to each frame of image may include an idle time $T_{blank}$, the idle data IDLE is transmitted in the idle time $T_{blank}$, and the idle data IDLE may be the idle data as shown in FIG. 4E. Exemplarily, FIG. 4H shows a schematic diagram of a format of a data signal provided by the related art. With reference to FIG. 4H, the data signal includes a display signal, a clock signal and an idle signal, the display signal carries display data DATA, the clock signal is embedded into the display signal, the idle signal is transmitted in an idle time $T_{blank}$, and the idle signal is a clock signal with a fixed frequency. In an exemplary embodiment, the timing controller may send a data signal as shown in FIG. 4G to the source driver via a data transmission line. In the data signal as shown in FIG. 4G, since the idle signal is a random signal, it does not easily form an energy spike, its electromagnetic radiation is small, and its transmission procedure does not easily affect the EMI characteristic of a display device.

At step 403, the source driver receives the idle signal sent by the timing controller.

The source driver may receive the idle signal sent by the timing controller. In particular, the source driver receives a data signal sent by the timing controller, which data signal includes a display signal, a clock signal and an idle signal, which clock signal is embedded into the display signal, wherein the idle signal is a random signal with a clock edge. For example, the source driver receives a data signal as shown in FIG. 4G sent by the timing controller.

At step 404, the source driver judges whether a clock signal of the source driver is synchronous with that of the timing controller according to the idle signal.

Figure 4I:
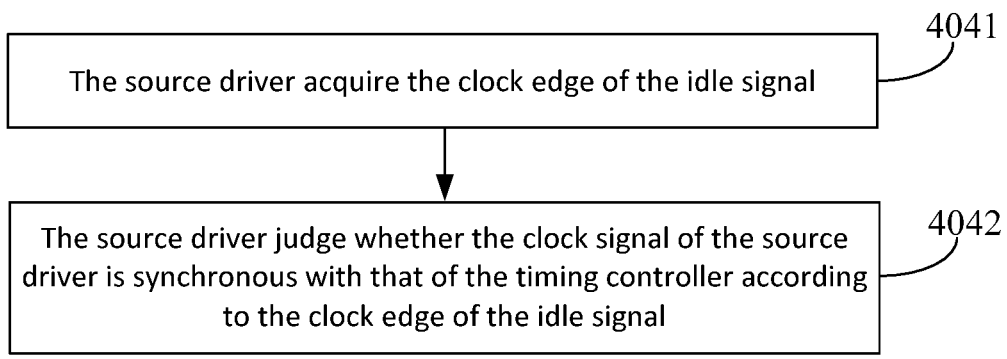
FIG. 4I is a flow chart of a method for judging whether a clock signal of the source driver is synchronous with that of the timing controller provided according to an exemplary embodiment.

After receiving the idle signal sent by the timing controller, the source driver may judge whether a clock signal of the source driver is synchronous with that of the timing controller according to the idle signal. In an exemplary embodiment, since what the source driver receives is a data signal including the idle signal, the source driver may first determine the idle signal from the data signal, and then judge whether the clock signal of the source driver is synchronous with that of the timing controller according to the idle signal. Therein, a procedure in which the source driver determines the idle signal from the data signal may be referred to the related art, which will not be limited by the disclosure. A method for the source driver to judge whether the clock signal of the source driver is synchronous with that of the timing controller according to the idle signal may be referred to FIG. 4I. With reference to FIG. 4I, the method may include the following sub-steps.

At sub-step 4041, the source driver acquires the clock edge of the idle signal.

The source driver may acquire the clock edge of the idle signal. In particular, since the idle signal includes multiple idle data, the clock edge of the idle signal is located between two adjacent idle data, and it can be seen from the description of the step 401 that, each of the idle data may be 10-bit data and there may be a clock edge between two adjacent idle data, the source driver may grab the idle signal in units of 10 bits to acquire clock edges of the idle signal, which will not be limited by the disclosure.

At sub-step 4042, the source driver judges whether the clock signal of the source driver is synchronous with that of the timing controller according to the clock edge of the idle signal.

In an exemplary embodiment, the source driver may recover the clock signal according to the clock edges of the idle signal, and then compare the clock signal of the source driver with the recovered clock signal, and if the clock signal of the source driver is the same as the recovered clock signal, then the clock signal of the source driver is synchronous with that of the timing controller, otherwise, the clock signal of the source driver is asynchronous with that of the timing controller.

Figure 4J:
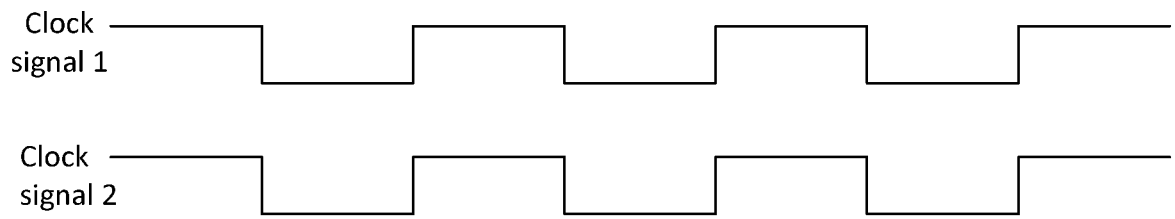
FIG. 4J is a comparison chart for clock signals provided according to an exemplary embodiment.

Exemplarily, FIG. 4J is a comparison chart for a recovered clock signal and the clock signal of the source driver provided according to an embodiment. Reference is made to FIG. 4J, wherein the clock signal 1 is a recovered clock signal, and the clock signal 2 is the clock signal of the source driver. The source driver compares the clock signal 1 with the clock signal 2, and may determine that the clock signal 1 is the same as the clock signal 2, and therefore, the source driver determines that the clock signal of the source driver is synchronous with that of the timing controller. It is noted that, this exemplary embodiment is illustrated taking that the clock signal of the source driver is the same as the recovered clock signal as an example, and when the clock signal of the source driver is different from the recovered clock signal, the source driver determines that the clock signal of the source driver is asynchronous with that of the timing controller, and at this point, the source driver may further perform error correction and calibration on the clock signal, and a specific implementation of this procedure may be referred to the related art, which will not be repeated here by the disclosure any longer.

At step 405, the source driver judges whether there is an error in the transmission procedure according to the idle signal.

Figure 4K:
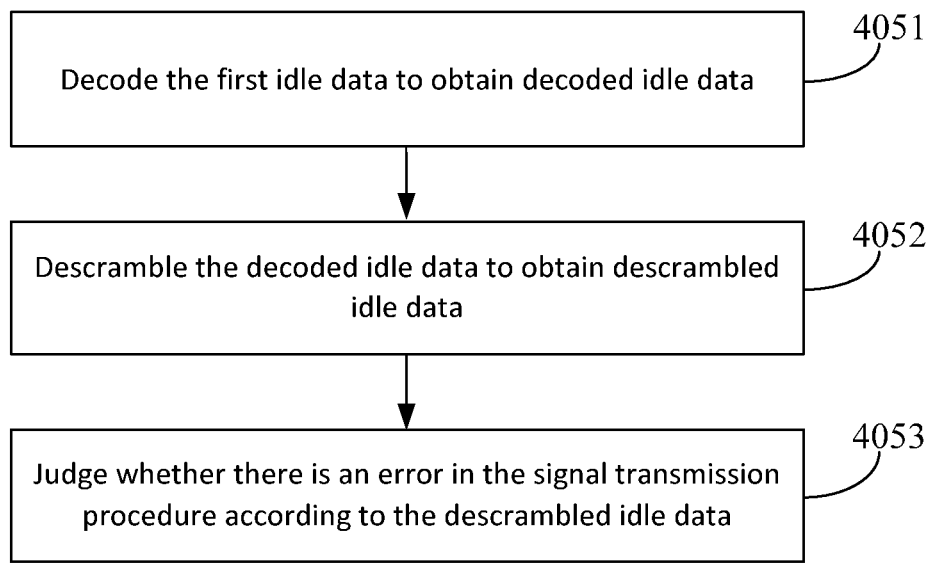
FIG. 4K is a flow chart of a method for judging whether there is an error in a signal transmission procedure provided according to an exemplary embodiment.

The source driver may judge whether there is an error in the transmission procedure according to the idle signal. In a specific implementation, since the idle signal carries multiple idle data, the source driver may judge whether there is an error in the transmission procedure according to a first idle data, which first idle data may be any of the multiple idle data carried by the idle signal. Exemplarily, reference is made to FIG. 4K, which shows a flow chart of a method for judging whether there is an error in a signal transmission procedure according to a first idle data provided according to an embodiment. With reference to FIG. 4K, the method includes the following sub-steps.

At sub-step 4051, the first idle data is decoded to obtain decoded idle data.

The source driver may decode the first idle data to obtain decoded idle data. In particular, it can be seen from the description of the step 401, the first idle data may be 10-bit data, and the first idle data is obtained by the timing controller performing 8b/10b encoding on random idle data, and therefore, the source driver may perform 8b/10b decoding on the first idle data to obtain decoded idle data. In particular, in the 8b/10b encoding, the timing controller first performs 8b/9b encoding on the random idle data, and then performs clock flip digit processing to obtain the first idle data. Therefore, at the sub-step 4051, the source driver may first perform de-clock-flip-digit processing on the first idle data to obtain 9-bit encoded random idle data, and then decode the 9-bit encoded random idle data to obtain decoded idle data, the decoded idle data is 8-bit data, and the decoded idle data may be the random idle data at the step 401, wherein the tenth digit of data of the first idle data is used for indicating whether the first 9 digits of data of the first idle data have undergone the encoding of bit-by-bit reversion, and when the tenth digit of data of the first idle data is 1, the tenth digit of data of the first idle data indicates that the first 9 digits of data of the first idle data have undergone the encoding of bit-by-bit reversion, and when the tenth digit of data of the first idle data is 0, the tenth digit of data of the first idle data indicates that the first 9 digits of data of the first idle data have not undergone the encoding of bit-by-bit reversion. Therefore, that the source driver performs de-clock-flip-digit processing on the first idle data may include the following procedure.

The source driver detects the tenth digit of data of the first idle data. If the tenth digit of data of the first idle data is 1, the source driver determines that the first 9 digits of data of the first idle data have undergone the encoding of bit-by-bit reversion, and hence the source driver may remove the tenth digit of data of the first idle data and perform digit-wise inversion on the first 9 digits of data of the first idle data to obtain 9-bit encoded random idle data. If the tenth digit of data of the first idle data is 0, the source driver determines that the first 9 digits of data of the first idle data have not undergone the encoding of bit-by-bit reversion, and hence the source driver may remove the tenth digit of data of the first idle data and determine the first 9 digits of data of the first idle data as 9-bit encoded random idle data. Exemplarily, assume that the first idle data is 1010111010. Since the tenth digit of data of the first idle data is 1, the first 9 digits of data of the first idle data have undergone the encoding of bit-by-bit reversion, and at this point, the source driver removes the tenth digit of data of the first idle data and performs digit-wise inversion on the first 9 digits of data of the first idle data to obtain 9-bit encoded random idle data 101000101. Again exemplarily, assume that the first idle data is 0101000101. Since the tenth digit of data of the first idle data is 0, the first 9 digits of data of the first idle data have not undergone the encoding of bit-by-bit reversion, and at this point, the source driver removes the tenth digit of data of the first idle data and determines the first 9 digits of data of the first idle data as 9-bit encoded random idle data, which 9-bit encoded random idle data is 101000101.

In an exemplary embodiment, the source driver may store a preset 8b/9b decoding (i.e., decoding 9-bit data into 8-bit data) mapping relationship, and the source driver may decode the 9-bit encoded random idle data according to the 8b/9b decoding mapping relationship to obtain decoded idle data, which decoded idle data is 8-bit data. Therein, the 8b/9b decoding mapping relationship stored by the source driver may be as follows:

Dout[7]=d_code[8];
Dout[6]=d_code[4];
Dout[5]=d_code[3];
Dout[4]=d_code[7];
Dout[3]=d_code[0];
Dout[2]=(d_code[6]^d_code[5])&~(~d_code[2]&d_code[1]);
Dout[1]=(d_code[6]^d_code[5])&~(d_code[2]&~d_code[1]);
Dout[0]=(d_code[6]&~d_code[5])|(d_code[6]&d_code[5]&d_code[2])|(~d_co de[6]&~d_code[5]&d_code[2]);

wherein d_code[i] is the (i+1)-th digit in the 9-bit data, 8≥i≥0, and i is an integer; Dout[j] is the (j+1)-th digit in the 8-bit data, 7≥j≥0, and j is an integer; and ^ represents performing an exclusive OR operation, ~ represents performing an inversion operation, & represents performing an AND operation, and represents performing an OR operation. Therein, explanation of the inversion operation, the AND operation and the OR operation may be referred to the step 401, performing an exclusive OR operation represents performing an exclusive OR operation on two binary numbers, and its rule is that the result of performing the exclusive OR operation is true when the two binary numbers are different, wherein true is 1, false is 0, and then 1^1=0, 1^0=1, 0^1=1, 1^1=0.

Exemplarily, taking that the 9-bit encoded random idle data 101000101 is decoded according to the above 8b/9b decoding mapping relationship as an example, wherein the first digit of data to the ninth digit of data of the 9-bit encoded random idle data 101000101 are successively 1, 0, 1, 0, 0, 0, 1, 0, 1, decoded idle data may be obtained by decoding the 9-bit encoded random idle data 101000101 according to the above 8b/9b decoding mapping relationship, which decoded idle data is 8-bit data 10001101, wherein in the decoded idle data, the eighth digit of data Dout[7]=d_code[8]=1;
the seventh digit of data Dout[6]=d_code[4]=0;
the sixth digit of data Dout[5]=d_code[3]=0;
the fifth digit of data Dout[4]=d_code[7]=0;
the fourth digit of data Dout[3]=d_code[0]=1;
the third digit of data Dout[2]=(d_code[6]^d_code[5])&~(~d_code[2]&d_code[1])=(1^0)&~(~1&0)=(1^0)&~(0&0)= 1&~0=1&1=1;
the second digit of data Dout[1]=(d_code[6]^d_code[5]) &~(d_code[2]&~d_code[1])=(1^0)&~(1&~0)=(1^0)&~ (1&1)=1&~1=1&0=0;
the first digit of data Dout[0]=(d_code[6]&~d_code[5])| (d_code[6]& d_code[5]&d_code[2])|(~d_code[6] &~d_code[5]&d_code[2])=(1&~0)|(1&0&1)|(~1&~0&1)= (1&1)|(1&0&1)|(0&1&1)=1|0|0=1.

At sub-step 4052, the decoded idle data is descrambled to obtain descrambled idle data.

After obtaining the decoded idle data, the source driver may descramble the decoded idle data to obtain descrambled idle data. Exemplarily, the decoded idle data is 10001101, and the source driver descrambles the decoded idle data 10001101.

In an exemplary embodiment, the source driver may first generate a pseudo-random sequence, and then descramble the decoded idle data employing the pseudo-random sequence, wherein the source driver may generate the pseudo-random sequence by a linear shift register, and the number of bit digits of the pseudo-random sequence may be equal to that of the decoded idle data, and since the number of bit digits of the decoded idle data is 8, the number of bit digits of the pseudo-random sequence is also 8, that is, the pseudo-random sequence is 8-bit data, and the source driver may perform exclusive OR processing on the pseudo-random sequence and the decoded idle data, to implement descrambling of the original idle data.

It is noted that, the linear shift register in the source driver may be the same as the linear shift register in the timing controller, and the clock signal of the timing controller is synchronous with that of the source driver. Each time a clock passes, the linear shift register may output a new pseudo-random sequence based on the pseudo-random sequence outputted at the previous clock. Based on this, for the same idle data, the pseudo-random sequence produced by the source driver is the same as the pseudo-random sequence produced by the timing controller. Therefore, the scrambling and descrambling procedures in the embodiments provided by the disclosure may be to employ the same pseudo-random sequence and perform exclusive OR processing on it and the original idle data twice as a whole, and thus the descrambling may be realized to recover the original idle data.

At sub-step 4053, it is judged whether there is an error in the signal transmission procedure according to the descrambled idle data.

After obtaining the descrambled idle data, the source driver judge whether there is an error in the signal transmission procedure according to the descrambled idle data. In an embodiment, since the original idle data is pre-agreed by the timing controller and the source driver, the source driver may acquire the original idle data agreed on by it and the timing controller, and then judge whether the descrambled idle data is the same as the agreed original idle data. If the descrambled idle data is the same as the agreed original idle data, the source driver determines that there is no error in the signal transmission procedure. If the descrambled idle data is different from the original idle data, the source driver determines that there is an error in the signal transmission procedure, and the source driver may judge the accuracy of the received data based on this.

Exemplarily, the descrambled idle data is 00000000, the original idle data agreed on by the source driver and the timing controller is 00000000, then the source driver may determine that the descrambled idle data is the same as the agreed original idle data by comparing the descrambled idle data with the agreed original idle data, and therefore, the source driver determines that there is no error in the signal transmission procedure. Again exemplarily, the descrambled idle data is 00010010, the original idle data agreed on by the source driver and the timing controller is 00000000, then the source driver may determine that the descrambled idle data is different from the agreed original idle data by comparing the descrambled idle data with the agreed original idle data, and therefore, the source driver determines that there is an error in the signal transmission procedure. Further, the source driver may further determine the number of digits of bits for which the descrambled idle data and the agreed original idle data are different, and determine the transmission error rate according to the number of digits of bits. For example, the number of digits for which the descrambled idle data 00010010 and the agreed original idle data 00000000 are different is 2, and therefore, the transmission error rate may be 2/8=25%. After determining the transmission error rate, the source driver may further feed the transmission error rate back to the timing controller, in order that the timing controller determines whether signal retransmission is required, or the source driver may judge whether calibration, etc. is required for the signal according to the transmission error rate, and perform a subsequent calibration operation, etc., which will not be repeated here by the disclosure any longer.

In a conventional point-to-point interface technique, clock recovery is required at the receiving end (the source driver), and it is necessary to be ensured at any moment that the frequency and phase of the clock of the receiving end keep consistent (i.e., keep clock synchronization) with those of the sending end (the timing controller). A common approach is that the sending end transmits a clock signal with a fixed frequency to the receiving end in an idle time (also called blanking time), and according to this clock signal, the receiving end determines its own internal clock and the clock signal of the receiving sending end, causes the phase and frequency of the two to keep consistent, and corrects a deviation in time when the phase and frequency of the two are inconsistent. However, the drawback of such a signal transmission lies in that, for the overall system of a display device, in a certain period of time (blanking time), all that is transmitted on the data transmission line between the sending end and the receiving end is a signal of a fixed frequency, and the energy of the signal of the fixed frequency will be concentrated on a frequency point to form an energy spike, which will affect the EMI characteristic of the display device. In the embodiments provided by the disclosure, a specially processed idle signal is employed to replace the clock signal with a fixed frequency, the specially processed idle signal is transmitted in the blanking time, the specially processed idle signal has clock edges, and the receiving end may acquire the clock signal of the sending end according to this feature of the idle signal, and judge the synchronization state of the clocks, and meanwhile, the idle signal is a random signal which has undergone pseudo-random processing, which can disperse the signal energy, thereby avoid the formation of an energy spike and improve the EMI characteristic of the display device.

In some exemplary embodiments, by performing 8b/10b encoding on the random idle data, the 8-bit random idle data is converted into 10-bit idle data suitable for channel transmission and transmitted; due to undergoing the 8b/10b encoding, a clock edge jump is added to the random idle data (namely, including 0/1 flip), such that the idle signal has features of a clock edge, and as such, the receiving end can judge whether the clock signal of the sending end is synchronous with that of the receiving end based on this; and meanwhile, a fixed clock edge (a rising edge or a falling edge) will be formed between two adjacent idle data of the idle signal after the encoding, and thus the receiving end can judge whether the data phase of the sending end is consistent with that of the receiving end according to the fixed clock edge between two adjacent idle data.

From the above, in the data transmission method provided by some embodiment of the disclosure, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

Figure 5A:
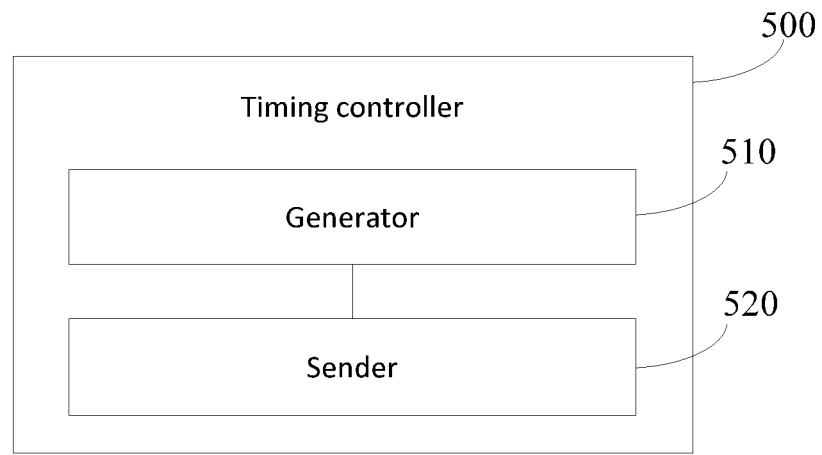
FIG. 5A is a block diagram of a timing controller provided according to an exemplary embodiment.

FIG. 5A shows a block diagram of a timing controller 500 provided according to an embodiment, which timing controller 500 may be used for performing a data transmission method provided by the embodiment as shown in FIG. 2 or FIG. 4A. With reference to FIG. 5A, the timing controller 500 may include:

a generator 510, which may be configured for generating an idle signal, which is a random signal with a clock edge; and a sender 520, which may be configured for sending the idle signal to a source driver, which source driver is any of a plurality of source drivers.

In the timing controller, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

In an exemplary embodiment, the idle signal carries at least two idle data successively arranged in a chronological order, there is a clock edge between any two adjacent idle data in the at least two idle data, and each of the idle data is random data.

Figure 5B:
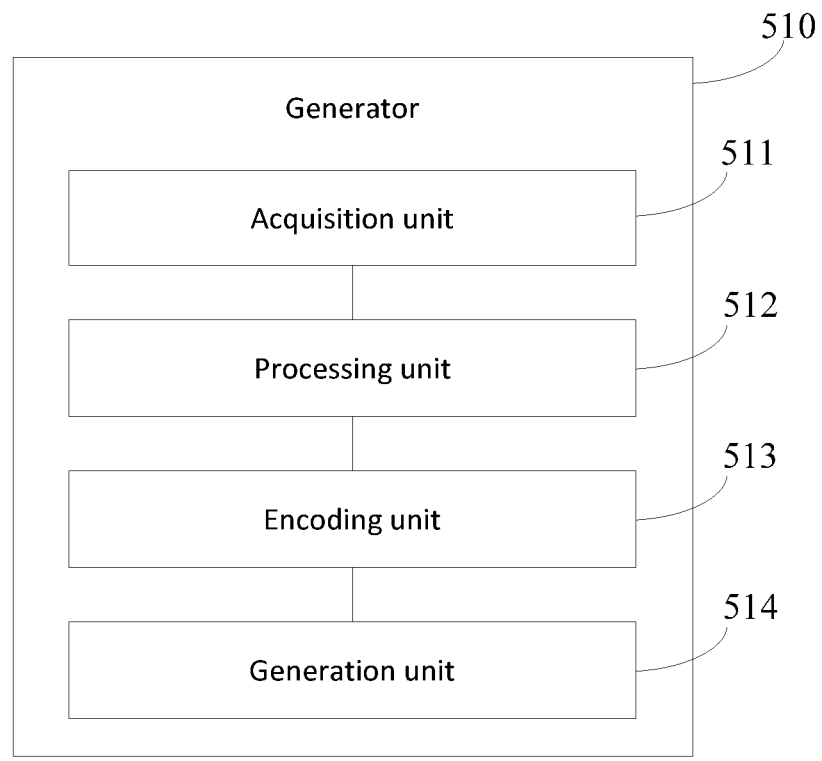
FIG. 5B is a block diagram of a generator provided according to an exemplary embodiment.

In an embodiment, reference is made to FIG. 5B, which shows a block diagram of a generator 510 provided according to an embodiment. With reference to FIG. 5B, the generator 510 may include:

an acquisition unit 511, which may be configured for acquiring original idle data, which is pre-agreed by the timing controller and the source driver;

a processing unit 512, which may be configured for performing pseudo-random processing on the original idle data to obtain random idle data;

an encoding unit 513, which may be configured for encoding the random idle data to obtain first idle data, which is any of the at least two idle data in the idle signal; and a generation unit 514, which may be configured for generating the idle signal according to at least two first idle data obtained respectively from units 511, 512 and 513.

In an exemplary embodiment, the processing unit 512 may further be configured for generating pseudo-random sequence, and scrambling the original idle data employing the pseudo-random sequence.

In an exemplary embodiment, the processing unit 512 may further be configured for generating pseudo-random sequence through a linear shift register.

In an exemplary embodiment, the number of bit digits of the pseudo-random sequence is equal to that of the original idle data, and the processing unit 512 may further be configured for performing XOR processing on the pseudo-random sequence and the original idle data.

In an exemplary embodiment, the random idle data is 8-bit data, the first idle data is 10-bit data, and the encoding unit 513 may further be configured for encoding the random idle data employing an 8b/10b encoding approach to obtain the first idle data.

In an exemplary embodiment, the encoding unit 513 may further be configured for:

encoding the random idle data according to a preset 8b/9b encoding mapping relationship to obtain encoded random idle data, which is 9-bit data; and performing clock flip digit processing on the encoded random idle data and adding a bit indicating whether clock flip digit processing has been performed to obtain the first idle data.

In an exemplary embodiment, the original idle data is binary data 00000000.

In an exemplary embodiment, the sender 520 may further be configured for sending a data signal to the source driver, the data signal including a display signal, a clock signal and an idle signal, and the clock signal is embedded into the display signal.

In the timing controller, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

Figure 6A:
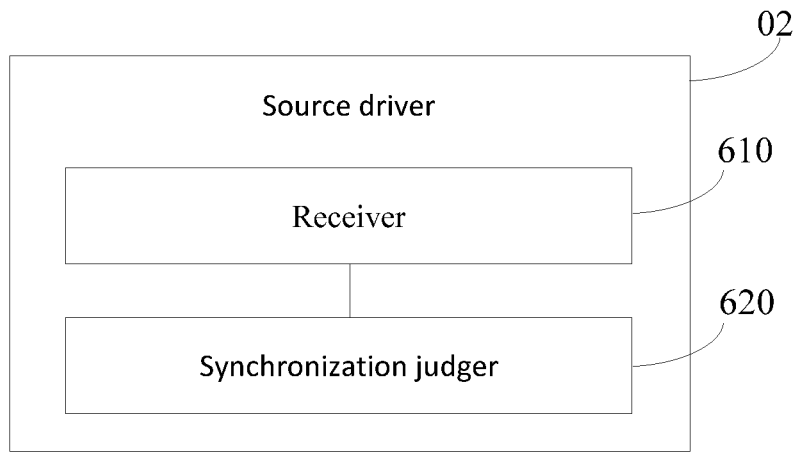
FIG. 6A is a block diagram of a source driver provided according to an exemplary embodiment.

FIG. 6A shows a block diagram of a source driver 02 provided according to an exemplary embodiment, which source driver 02 may be used for performing a data transmission method provided by the embodiment as shown in FIG. 3 or FIG. 4A. With reference to FIG. 6A, the source driver 02 may include:

a receiver 610, which may be configured for receiving an idle signal sent by the timing controller, which idle signal is a random signal with a clock edge; and a synchronization judger 620, which may be configured for judging whether a clock signal of the source driver is synchronous with that of the timing controller according to the idle signal.

In the source driver, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

In an exemplary embodiment, the synchronization judger 620 may further be configured for:

acquiring the clock edge of the idle signal; and judging whether the clock signal of the source driver is synchronous with that of the timing controller according to the clock edge of the idle signal.

In an exemplary embodiment, the idle signal carries at least two idle data successively arranged in a chronological order, there is a clock edge between any two adjacent idle data in the at least two idle data, and each of the idle data is random data.

Figure 6B:
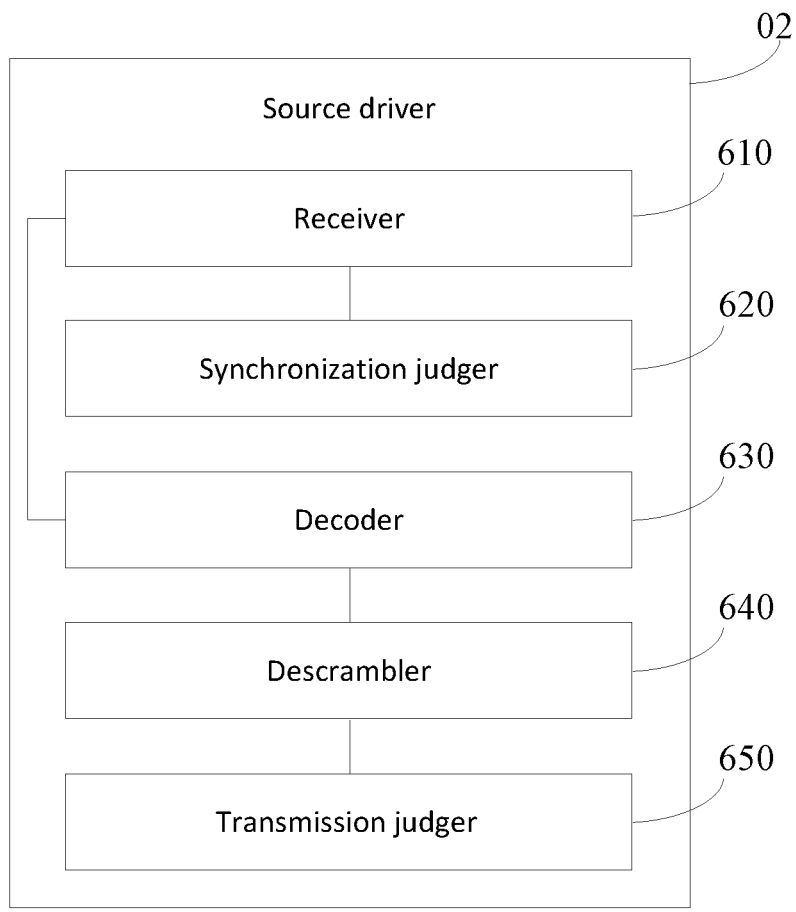
FIG. 6B is a block diagram of another source driver provided according to an exemplary embodiment.

In an exemplary embodiment, the idle data is obtained by the timing controller scrambling original idle data to obtain random idle data and then encoding the random idle data, and the idle data is any of the at least two idle data in the received idle signal. Reference is made to FIG. 6B, which shows a block diagram of another source driver 02 provided according to an embodiment. With reference to FIG. 6B, on the basis of FIG. 6A, the source driver 02 may further include:

a decoder 630, which may be configured for decoding the idle data to obtain decoded idle data;

a descrambler 640, which may be configured for descrambling the decoded idle data to obtain descrambled idle data; and a transmission judger 650, which may be configured for judging whether there is an error in the signal transmission procedure according to the descrambled idle data.

In an exemplary embodiment, the original idle data is pre-agreed by the timing controller and the source driver, the transmission judger 650 may further be configured for:

judging whether the descrambled idle data is the same as the original idle data;

determining that there is no error in the signal transmission procedure if the descrambled idle data is the same as the original idle data; and determining that there is an error in the signal transmission procedure if the descrambled idle data is different from the original idle data.

In an exemplary embodiment, the original idle data is binary data 00000000.

In an exemplary embodiment, the receiver 610 may further be configured for receiving a data signal sent by the timing controller, which data signal includes a display signal, a clock signal and an idle signal, which clock signal is embedded into the display signal.

In the source driver, since the idle signal is a random signal, the idle signal will not form an energy spike, and since the idle signal has a clock edge, the source driver may judge whether clocks are synchronous according to the idle signal, which solves a problem of a poor anti-EMI capability of a display device due to an idle signal easily forming an energy spike, and improves the anti-EMI capability of the display device.

According to a further aspect of the disclosure, there is provided a display device including a timing controller and a source driver, and a way of connecting the two may be referred to FIG. 1. The timing controller may be the timing controller 500 as shown in FIG. 5A, and the source driver may be the source driver 02 as shown in FIG. 6A or FIG. 6B.

The display device may be any product or component with the display function, such as a liquid crystal display device, an electronic paper, an organic light emitting diode (OLED) panel, a mobile phone, a tablet computer, a television, a display, a notebook computer, a digital photo frame, a navigator, etc.

It may be appreciated by the person having ordinary skills in the art that, all or part of the steps implementing the above embodiments may be implemented by hardware including several distinct elements, or also by suitably programmed software or firmware, or by any combination thereof. The software may be stored in a computer readable storage medium including, but not limited to, a read-only memory, a magnetic disk or an optical disk, etc.

It may be appreciated that, what are described above are just exemplary embodiments of the disclosure, however, the protective scope of the invention is not limited thereto. It should be pointed out that, various variations or alternatives may readily occur to the person having ordinary skills in the art, and these variations or alternatives should all be encompassed in the protective scope of the invention, without departing from the spirit and principle of the disclosure. Therefore, the protective scope of the invention should be subject to the protective scope of the appended claims.

It is noted that, the above embodiments are just illustrated by division of the above various functional modules, and in a practical application, the above functions may be allocated to different functional modules for accomplishment as needed. It may be possible to divide the internal structure of a device into different functional modules to accomplish all or part of the above described functions. In addition, the function of one module described above may be accomplished by multiple modules, and the functions of multiple modules described above may also be integrated into one module for accomplishment.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

In the claims, any reference sign placed between the parentheses shall not be construed as limiting to a claim. The term "include" does not exclude the presence of an element or a step other than those listed in a claim. The word "a" or "an" preceding an element does not exclude the presence of a plurality of such elements.

In an apparatus or system claim enumerating several devices, one or more of the devices may be embodied by one and the same hardware item. The mere fact that certain measures are recited in mutually different dependent claims does not indicate that a combination of these measures cannot be used to advantage.

The invention claimed is:

1. A data transmission method for a timing controller, the timing controller being coupled to at least one source driver, the method comprising:
generating an idle signal, wherein the idle signal carries at least two idle data successively arranged in a chronological order, there is a clock edge between any two adjacent idle data in the at least two idle data, and each of the idle data is random data; and
sending the idle signal to one of the at least one source driver, wherein the step of generating an idle signal comprises generating the at least two idle data respectively, and generating any of the at least two idle data comprises:
acquiring original idle data, wherein the original idle data is pre-determined by the timing controller and the source driver, and stored by the timing controller; and when it is needed to generate the idle signal, the original idle data stored by the time controller is read by the timing controller to realize acquisition of the original idle data;
performing pseudo-random processing on the original idle data to obtain random idle data, comprising generating a pseudo-random sequence; and scrambling the original idle data employing the pseudo-random sequence; and
encoding the random idle data to obtain a first idle data, which is any of the at least two idle data,
wherein the idle signal is different from a display signal.

2. The method as claimed in claim 1, wherein the number of bit digits of the pseudo-random sequence is equal to that of the original idle data, and the step of scrambling the original idle data employing the pseudo-random sequence comprises: performing XOR processing on the pseudo-random sequence and the original idle data.

3. The method as claimed in claim 1, wherein the random idle data has a first length, and the first idle data has a second length that is greater than the first length at least by 2.

4. The method as claimed in claim 1, wherein the random idle data is 8-bit data, the first idle data is 10-bit data, and the step of encoding the random idle data to obtain a first idle data comprises: encoding the random idle data employing an 8b/10b encoding approach to obtain the first idle data;
wherein the step of encoding the random idle data to obtain first idle data comprises:
encoding the random idle data according to a preset encoding mapping relationship to obtain encoded random idle data, of which the length is between the first length and the second length; and
performing clock flip digit processing on the encoded random idle data and adding a bit indicating whether clock flip digit processing has been performed to obtain the first idle data.

5. A data transmission method for a source driver, the method comprising:
receiving an idle signal sent by a timing controller, wherein the idle signal carries at least two idle data successively arranged in a chronological order, there is a clock edge between any two adjacent idle data in the at least two idle data, and each of the idle data is random data;
judging whether a clock signal of the source driver is synchronous with that of the timing controller according to the idle signal,
wherein the step of receiving an idle signal sent by a timing controller comprises receiving the at least two idle data sent by the timing controller respectively, and generating any of the at least two idle data by the timing controller comprises:
acquiring original idle data, wherein the original idle data is pre-determined by the timing controller and the source driver, and stored by the timing controller; and when it is needed to generate the idle signal, the original idle data stored by the time controller is read by the timing controller to realize acquisition of the original idle data;
performing pseudo-random processing on the original idle data to obtain random idle data, comprising generating a pseudo-random sequence; and scrambling the original idle data employing the pseudo-random sequence; and
encoding the random idle data to obtain a first idle data, which is any of the at least two idle data,
wherein the idle signal is different from a display signal.

6. The method as claimed in claim 5, wherein the step of judging whether a clock signal of the source driver is synchronous with that of the timing controller according to the idle signal further comprises:
acquiring the clock edge of the idle signal; and
judging whether the clock signal of the source driver is synchronous with that of the timing controller according to the clock edge of the idle signal.

7. The method as claimed in claim 5, wherein the idle data is obtained by the timing controller scrambling original idle data to obtain random idle data and then encoding the random idle data, and the method further comprises:
decoding the idle data to obtain decoded idle data;
descrambling the decoded idle data to obtain descrambled idle data; and
judging whether there is an error in the signal transmission procedure according to the descrambled idle data;
wherein the original idle data is pre-determined by the timing controller and the source driver, and the step of judging whether there is an error in the signal transmission procedure according to the descrambled idle data comprises:
judging whether the descrambled idle data is the same as the original idle data;
determining that there is no error in the signal transmission procedure if the descrambled idle data is the same as the original idle data; and
determining that there is an error in the signal transmission procedure if the descrambled idle data is different from the original idle data.

8. A timing controller, wherein the timing controller is coupled to at least one source driver and the timing controller is configured for:
generating an idle signal, wherein the idle signal carries at least two idle data successively arranged in a chronological order, there is a clock edge between any two adjacent idle data in the at least two idle data, and each of the idle data is random data; and
sending the idle signal to one of the at least one source driver, wherein the step of generating an idle signal comprises generating the at least two idle data respectively, and generating any of the at least two idle data comprises:
acquiring original idle data, wherein the original idle data is pre-determined by the timing controller and the source driver, and stored by the timing controller; and when it is needed to generate the idle signal, the original idle data stored by the timing controller is read by the timing controller to realize acquisition of the original idle data;

performing pseudo-random processing on the original idle data to obtain random idle data, comprising generating a pseudo-random sequence; and scrambling the original idle data employing the pseudo-random sequence; and encoding the random idle data to obtain a first idle data, which is any of the at least two idle data, wherein the idle signal is different from a display signal.

9. The timing controller as claimed in claim 8, wherein the number of bit digits of the pseudo-random sequence is equal to that of the original idle data, and the step of scrambling the original idle data employing the pseudo-random sequence comprises: performing XOR processing on the pseudo-random sequence and the original idle data.

10. The timing controller as claimed in claim 8, wherein the random idle data has a first length, and the first idle data has a second length that is greater than the first length at least by 2.

11. The timing controller as claimed in claim 8, wherein the random idle data is 8-bit data, the first idle data is 10-bit data, and the step of encoding the random idle data to obtain a first idle data comprises: encoding the random idle data employing an 8b/10b encoding approach to obtain the first idle data;

wherein the step of encoding the random idle data employing an 8b/10b encoding approach to obtain the first idle data comprises:

encoding the random idle data according to a preset 8b/10b encoding mapping relationship to obtain encoded random idle data, which is 9-bit data; and performing clock flip digit processing on the encoded random idle data and adding a bit indicating whether clock flip digit processing has been performed to obtain the first idle data.

12. The timing controller as claimed in claim 8, wherein the timing controller is coupled to a plurality of source drivers each being configured for:

receiving an idle signal sent by the timing controller, wherein the idle signal carries at least two idle data successively arranged in a chronological order, there is a clock edge between any two adjacent idle data in the at least two idle data, and each of the idle data is random data; and judging whether a clock signal of the source driver is synchronous with that of the timing controller according to the idle signal.

13. A source driver, being configured for:

receiving an idle signal sent by the timing controller, wherein the idle signal carries at least two idle data successively arranged in a chronological order, there is a clock edge between any two adjacent idle data in the at least two idle data, and each of the idle data is random data; and judging whether a clock signal of the source driver is synchronous with that of the timing controller according to the idle signal, wherein the step of receiving an idle signal sent by a timing controller comprises receiving the at least two idle data sent by the timing controller respectively, and generating any of the at least two idle data by the timing controller comprises:

acquiring original idle data, wherein the original idle data is pre-determined by the timing controller and the source driver, and stored by the timing controller; and when it is needed to generate the idle signal, the original idle data stored by the time controller is read by the timing controller to realize acquisition of the original idle data;

performing pseudo-random processing on the original idle data to obtain random idle data, comprising generating a pseudo-random sequence; and scrambling the original idle data employing the pseudo-random sequence; and encoding the random idle data to obtain a first idle data, which is any of the at least two idle data, wherein the idle signal is different from a display signal.

14. A source driver as claimed in claim 13, wherein the step of judging whether a clock signal of the source driver is synchronous with that of the timing controller according to the idle signal further comprises:

acquiring the clock edge of the idle signal; and judging whether the clock signal of the source driver is synchronous with that of the timing controller according to the clock edge of the idle signal.

15. A source driver as claimed in claim 13, wherein the method further comprises:

decoding the idle data to obtain decoded idle data;

descrambling the decoded idle data to obtain descrambled idle data; and judging whether there is an error in the signal transmission procedure according to the descrambled idle data.

* * * * *